United States Patent Office 3,367,890
Patented Feb. 6, 1968

3,367,890
PROCESS FOR FORMING FOAMED POLYESTERS WHILE SUBMERGED IN WATER
Robert J. McManimie, Glendale, Mo., assignor to Monsanto Company, St. Louis, Mo., a corporation of Delaware
No Drawing. Filed July 10, 1964, Ser. No. 381,912
10 Claims. (Cl. 260—2.5)

ABSTRACT OF THE DISCLOSURE

Process for forming a foamed polyester under water comprising conducting while submerged in water a reaction of (a) an olefinically unsaturated polycarboxylic acid anhydride,
(b) a polyol, and
(c) an ethylenically unsaturated monomer, in the presence of an expanding agent and in the presence of a free radical catalyst obtained by the decomposition of a peroxygen compound, wherein the exotherm of the reaction is employed in conjunction with said expanding agent.

---

This invention relates to a process for producing foamed compositions under conditions of high moisture. In one aspect, this invention relates to a process for reacting a monomer system exposed to a high degree of moisture in the form of rain, snow, excessive humidity, and the like, to produce a foamed polymeric composition. In another aspect, this invention relates to a process for reacting a monomer system submerged in water to produce a foamed polymeric composition.

Certain monomer systems and prepolymer and polymer systems are so sensitive to water that difficulty is often experienced in foaming under adverse weather conditions, e.g. rain, snow, high humidity, etc. It is a primary object of this invention to provide a method for producing foamed polymeric compositions under conditions of high moisture. It is a further object of this invention to provide a monomer system capable of producing a foamed polymeric composition while submerged in water. Additional objects, benefits, and advantages will become apparent as the detailed description of the invention proceeds.

This invention is based upon the discovery that some of the monomer systems capable of producing the foamed polymeric compositions of copending U.S. patent applications, Serial No. 328,120, filed December 4, 1963, and Serial No. 328,124, filed December 4, 1963, are so insensitive to moisture conditions that foamed polymers can be produced therefrom even though the monomer systems are submerged in water. More specifically, the present invention describes a process for preparing foamed polymeric compositions which comprises reacting under conditions of high moisture an olefinically unsaturated polycarboxylic acid anhydride, a polyol, and an ethylenically unsaturated monomer in the presence of an expanding agent and in the presence of a free radical catalyst obtained by the accelerated decomposition of a peroxygen compound. The present process is further limited to those cases where the exotherm of the reaction is employed in conjunction with the expanding agent to produce a cellular product.

The foamed polymeric compositions useful in the practice of the present invention can be characterized as cross-linked polyesters. The polyester compositions are prepared by the copolymerization of an olefinically unsaturated polycarboxylic acid anhydride with a polyol in the presence of a vinyl monomer copolymerizable with the unsaturated acid anhydride. Optionally, the monomer mixture useful in preparing the polyester compositions of this invention can also contain a portion of a prefoamed unsaturated polyester prepolymer. The exotherm produced by the interreactions described above expands an inert liquid or decomposes an inert gas-releasing agent to produce the cellular product.

The olefinic polycarboxylic acid anhydrides useful herein are compounds having ethylenic unsaturation activated by adjacent carbonyl groups. Examples include maleic anhydride, itaconic anhydride, acrylic anhydride, crotonic anhydride, and citraconic anhydride.

Polyols useful as components in the present invention can be dihydric alcohols, polyhydric alcohols, and polyethers with hydroxyl chain ends. The polyethers are characterized by a plurality of ether oxygens and at least two active hydrogen atoms as determined by the Zerevitinov method. Preferred polyols are those compounds which are not readily soluble in water. However, even water-soluble polyols can be used if sufficient polyol is available to compensate for the portion lost by dissolving in water or if the polyol has been prereacted with the acid anhydride to yield low molecular weight polymeric esters which are less soluble than the monomeric polyol. Suitable examples of polyols include ethylene glycol, propylene glycol diethylene glycol, tetraethylene glycol, polyethylene ether glycol, polypropylene ether glycol, polybutylene ether glycol, neopentyl glycol, butanediol, pentanediol, 2,2,4-trimethyl-1,3-pentanediol, glycerine, triethanolamine, diethanolamine, sorbitol, mannitol, 1,4-cyclohexanedimethanol, 2,2,4,4-tetramethyl-1,3-cyclobutanediol, pentaerythritol, diglycerol, triglycerol, trimethylol propane, and 1,2,6-hexanetriol. Additional polyols include the polyethers having hydroxyl groups at the chain ends such as the reaction product of one or more alkylene oxides with acyclic and alicyclic polyols, as for example polyoxyethylene glycols, polyoxypropylene glycols, polyoxybutylene glycols, and mixtures thereof such as polyoxypropyleneoxybutylene glycol. Other acyclic and alicyclic polyols include the alkyl glucosides and the polyethers prepared by the reaction of alkylene oxides with sugars. Suitable polyols can also be prepared by reacting an alkylene oxide with acyclic polyamines such as ethylenediamine, propylenediamine, diethylenetriamine, and triethylenetetraamine.

The vinyl monomer used in the moisture-resistant monomer mixture can be any compound which will copolymerize with the double bond of the acid anhydride. Examples include styrene, β-methylstyrene, vinyl toluene, isobutylene, vinyl acetate, vinyl chloride, vinyl alkyl ethers, alkyl acrylates, and alkyl methacrylates. Occasionally, it is desirable to employ a solution of polymer in the monomer to obtain a certain viscosity at the start of the interpolymerization. Thus a solution of polystyrene in styrene monomer can be employed in the polymerization system if the remaining components are formulated to avoid precipitation of polystyrene on mixing.

Although the individual components of the cellular compositions of the present invention have been described individually it should be understood that two or more of the reactants can be combined either as monomeric materials or as prepolymers prior to the onset of the foaming interpolymerization reactions. In fact when water-soluble components are selected for use it may even be desirable to incorporate into the polymerization system in place of the water-soluble monomers a prepolymer formed therefrom,, thereby increasing the moisture insensitivity of the system.

The interpolymerization is conducted in the presence of an expanding agent which expands the reaction mass to the cellular structure. This expanding agent can be a liquid selected to have a boiling point below the temperature reached during the polymerization or it can be a solid that decomposes to release a gaseous product. Product expansion can also be obtained by bubbling a gas through the reactants prior, and during, polymerization although in many instances this poses problems of control of said stream and of cell size. In one aspect of the present process, a polymerization system is expanded by a frothing process which comprises mixing the catalyzed monomer mixture with an inert gas or low-boiling liquid under pressures sufficient to keep the gas or low-boiling liquid in the liquid state, then releasing the gas or liquid to atmospheric pressure whereupon a froth is formed at low temperatures. Such a frothing agent may be used as the sole pneumatogen or may be used with other materials which act at higher temperatures to give a further expansion of the froth. The quantity of blowing agent employed can be varied with the particular intended application of the cellular composition, and the use of the cellular product fixes the type of expanding agent as explained herein. Although most of the practical uses envisioned for the process of this invention would require rigid foamed compositions, the use of flexible, open-celled foams is also definitely included within the scope of this invention.

Foamed compositions of interest as refrigeration insulation must have a heat transfer coefficient, K. factor, (B.t.u./hr./ft.$^2$/in./° F.) of 0.10 to about 0.15. The low value for heat conductivity is obtained by the use of polyhalogenated carbon compounds, particularly the fluorocarbons, as expanding agents. The foamed product contains the polyhalogenated carbon compound trapped within the closed cells. Representative examples of polyhalogenated carbon compounds which can be used include trichlorofluoromethane, trichloro-trifluoroethane, dichlorohexafluoropropane, monochloro - heptafluorocyclobutane, diclorofluoroethylene, 2,3-dichloro-1,1,3,3-tetrafluoropropene - 1, 1,1,2,2 - tetrachloro - 1,2 - difluoroethane, 1,2 - dichloro - 1,1,2,2-tetrafluoroethane, 1-2-dichlorohexafluorocyclobutane, perfluorocyclobutane, and 1,2,2-trichloro-1,1,2-trifluoroethane.

For many applications of the cellular compositions of this invention, any of the many known blowing agents can be used so long as the blowing agent selected has a vaporization or decomposition temperature which is appropriate for the particular polymer system being foamed. In most cases, the blowing agent should be one which is effective to release a gas at temperatures within the range of about 50° C. to 250° C. Other materials suitable as expanding agents include methyl chloride, n-pentane, methylether, methylethylether, ethylene, propylene, isobutylene, butene-1, nitrogen, sulphur dioxide, dinitrosopentylenetetramine, azo-bis-isobutyronitrile, azodicarbonamide, 1,1-azo-bisformamide, benzenesulfonyl hydrazide, m,m'-dinitroso-m,m'-dimethyl terephthalamide, ammonium carbamate, diazoaminobenzene, p,p'-oxybis-(benzenesulfonyl hydrazide), ureabiuret, 2,2'-azo-isobutyronitrile, azohexahydrobenzonitrile, diisobutylene, 4,4'-diphenyldisulfonylazide.

Optional additives such as nucleating agents, dispersing agents, cell stabilizers, surfactants, flame retardants, fillers, and reinforcing agents can be employed in preparing the cellular materials of this invention.

Irregularity of cell size can be overcome to some extent by the addition of nucleating agents, e.g., finely divided calcium silicate hydrates, exploded mica, silica flour, wood flour, carbon black, metal oxide, talc, and silica gel to the foamable composition. These nucleators aid in the formation of foams having a large number of small cells without wide variation in cell sizes. A finer cell structure can be obtained if water-dispersible or water-soluble organo silicone polymers are used as surfactants. These organo silicone polymers have a molecular weight of about 2500 to 6000 and may be obtained by condensing a polyalkoxy polysilane with the mono ether of a polyalkyleneether glycol in the presence of an acid catalyst. Other surfactants such as ethylene oxide modified sorbitan monopalmitate or ethylene oxide modified polypropyleneether glycol can also be used to obtain better dispersion of the components. Representative surfactants which are water-soluble organo silicone polymers are available commercially. An example of such a surfactant is dimethylpolysiloxane/polyoxyalkylene copolymer.

The cellular compositions of the present invention can be prepared having either closed cells or open cells. A high content of closed cells is obtained when gelation caused by the interpolymerization reactors occurs nearly simultaneously with the maximum of the polymerization exotherm. A high content of open cells can be obtained by adjusting the gelation time to occur just slightly prior to the maximum exotherm. If gelation occurs at a point too soon before the maximum exotherm, there is a diminished foam rise and the gases which are evolved escape through fissures in the foam. On the other hand, if the gelation reaction occurs later than the maximum exotherm, the foam which is produced collapses. For component systems within the scope of this invention, gelation time and the polymerization exotherm can be established by routine experimentation and adjustments made in order to obtain noncollapsing foam.

The viscosity of the overall reaction mixture, prior to the onset of the interpolymerization, can be controlled by several techniques. The viscosity can pe increased by polymerization of part or all of the mixture through catalytic effects. In many cases it is desirable to add a viscosity improving agent in order to prevent dissolving of the reaction components or to prevent excessive dispersion of the reaction components prior to their polymerization. A saturated polyester can be added to increase viscosity. Other polymeric materials can also be used to modify viscosity such as the Novolac resins, resole resins, furan resins, the aminoplasts such as urea-formaldehyde or melamine-formaldehyde, and the lower molecular weight unsaturated rubbers. The viscosity improvers can be modified with inert fillers to further increase viscosity. These additives can be selected so that they are cured during the polymerization exotherm, or they can perform a plasticizer function in the finished polymeric foam. Selection of the viscosity modifier, if used, depends on the particular catalyst system and also upon the properties desired in the foamed product, and a modifier can be chosen by operating within the teachings and illustrations of the present disclosure.

The catalyst system can be any compound or mixture of compounds which generate free radicals under the reaction conditions described herein. Examples of such materials are the peroxides, such as diacetyl peroxide, benzoyl peroxide, diethyl peroxide, hydrogen peroxide, and acetone peroxide; hydroperoxides such as cyclohexyl hydroperoxide, t-butyl hydroperoxide, and cumene hydroperoxide; hydrazine derivatives such as hydrazine sulfate; amine oxides such as pyridine oxide and dimethylaniline oxide; alkali metal and ammonium persulfates, perborates, and percarbonates; azines such as benzalazine; oximes such as butyraldoxime; hydrazones such as benzaldehyde phenylhydrazone; semicarbazones such as the semicarbazones of acetone; Schiff's bases such as benzalaniline; anils such as acetaldehyde anil; and oxygen.

Also required in conjunction with the free radical catalyst is an accelerator which increases the rate of decomposition of the peroxygen compound, thereby promoting the production of free radicals at a faster rate than can be achieved by the peroxygen compounds alone. This action in turn accelerates the rate of polymerization. Examples of such materials include the boron hydrides such as borane, diborane, triborane and the substituted boranes such as trimethylborane, triethylborane, tri-n-butylborane, tri-n-hexylborane, and triphenylborane. Particularly preferred are the trihydrocarbylboranes wherein the hydrocarbyl group has from 1 to about 6 carbon atoms. Particularly preferred is the use of a complexing agent to enhance the effectiveness of the accelerator. Useful complexing agents are the amino compounds such as methylamine, diethylamine, dimethylbutylamine, pyridine, and aniline. When utilized, the mole ratio of amine to boron compound is usually within the range of 0.5 to 1 up to 2 to 1, although higher and lower ratios can also be used.

Cellular compositions can be prepared by a one stage foaming technique wherein gelation of the polymer components occurs simultaneously with the polymerization exotherm. Compositions can also be prepared by frothing techniques wherein an initial expansion of the total component system is accomplished by the sudden release of a compressed gas or low-boiling liquid. The sudden expansion is provided by the release of the mixed streams from a mixing chamber maintained at a superatmospheric pressure. Thus, the components can be expanded to as much as 10 or 15 times their original volume upon discharge from the mixing head. The components can then be further expanded to 200% to 500% over the expanded volume of the froth by employment of the polymerization exotherm. For example, a mixture of a low-boiling fluorocarbon together with a fluorocarbon having a somewhat higher boiling point is charged to the component streams so that the frothing technique utilizes the comparatively lower boiling fluorocarbon to provide initial expansion while the higher boiling fluorocarbon is expanded by the reaction exotherm. Foamed materials prepared by the frothing technique are characterized by a uniform closed cell construction wherein the individual cells are minute in size. The frothing technique further has the advantage of permitting cell formation prior to the gelation reaction which is desirable when gelation occurs prior to the achievement of maximum exotherm temperature. It will be understood that the forthing technique usually requires modifications of the foam making machine so that the preliminary mixing of the reaction components is carried out under pressure prior to their passage from the mixing head or nozzle. Reactor modifications for this purpose are described in Chemical Engineering Progress, vol. 57, pages 40–46 (1961).

In the preparation of the foamed products, reactant streams can be fed to a mixing nozzle or foaming head so that a uniform mixture of reactants is obtained for making a foam-in-place or spray-in-place product. Since it is desirable to incorporate various additives in the reactant stream, and yet necessary to keep the number of separate reactant streams at a minimum to avoid a mechanically complicated mixing nozzle and controls thereto, we have found that various reactants can be combined. Combination of reactant solutions simplify the processing step and provide a convenient means for control of product quality. Thus the polycarboxylic acid anhydride can be dissolved in polyol prior to the interpolymerization. Long periods of storage are to be avoided, however, since esterification of the anhydride takes place even at room temperatures upon prolonged storage, e.g. three or four days. If polyester is used, it can be prepared as a solution in the ethylenically unsaturated monomer. This solution can be mixed and stored at room temperature with the foam stabilization agent. The expanding agent can also be added to this solution if desired. One day's requirements of a reactant stream can be stored at temperatures below 25° C., wherein said stream contains polyester, ethylenically unsaturated monomer and peroxide catalyst component along with the expanding agent.

The catalyst components are combined in the foam nozzle so that separate constituents of the catalyst are used in the various streams. If a boron trialkyl compound is used as a catalyst component, this compound, modified by an amino compound, can be dissolved in a reactant stream containing part of the polyol with no adverse effects.

The finished compositions can have incorporated therein fillers, dyes, stabilizers, antioxidants, flame retardants, and pigments. As a general procedure, the additives, preferably selected from materials inert to the interpolymerization reaction, can be added to one or more of the reactant streams. However, it will be understood that necessary reactants can be chosen that possess a dual function, for example, the polyol reactant and also polyester viscosity modifier can be selected from among the chemical types known to impart fire retardant properties to the final compositions. The polyol phosphites, polyol phosphonates and diol alkene phosphonates can be used as part or all of the polyol reactant, and the polyester can be, for example, based on maleic anhydride-perchlorocyclopentadiene to obtain foams having fire-resistant properties.

The cellular products useful in the process of the present invention are complex products obtained by the simultaneous interpolymerization and interaction of three essential components in the presence of an expanding agent. Polymerization occurs to yield comparatively long product chains and the crosslinking reaction provides a fixed network of these chains.

The following tabulation sets forth guidelines for the mole ratio range for the essential reactants:

(a) Unsaturated polycarboxylic acid anhydride—1.0 mole.
(b) Polyol—about 0.25 equivalent to about 4 equivalents of hydroxyl groups per equivalent of carbonyl groups in the unsaturated polycarboxylic monomer, and
(c) Ethylenically unsaturated monomer—about 0.25 mole to about 6 moles per mole of unsaturated polycarboxylic monomer.

The preferred reactant range is as follows:

(a) Unsaturated polycarboxylic acid anhydride—1.0 mole.
(b) Polyol—about 0.5 equivalents to about 2 equivalents of hydroxyl groups per equivalent of carbonyl groups in the polycarboxylic monomer, and
(c) Ethylenically unsaturated monomer—about 0.5 mole to 4 moles per mole of unsaturated polycarboxylic monomer.

The invention will be more clearly understood when read in view of the detailed descriptions set forth in the following specific examples.

EXAMPLE 1

The following quantities of materials are mixed together in the order given:

20.0 grams of tetraethylene glycol,
19.8 grams of maleic anhydride,
21.0 grams of styrene,
0.3 gram of cumene hydroperoxide,
15.8 grams of a flame-retardant polyester (HETRON 32A)
8.6 grams of trichlorofluoromethane (Freon-11)
0.2 gram of octylamine, and
0.6 gram of a 1:1 mole ratio mixture of triethylborane and pyridine.

The mixture is poured into a 2 liter beaker half full of water and allowed to settle on the bottom of the beaker. The temperature of the water is about 15 to 20° C. About 10 seconds after pouring, the mixture begins to foam and rises to the surface of the water where the foaming and polymerization is completed.

EXAMPLE 2

A quantity of 7.6 grams (0.1 mole) of propylene glycol is stirred and warmed slightly with 19.8 grams (0.2 mole) of maleic anhydride to obtain a clear solution. To this solution is added 20.8 grams (0.2 mole) of styrene, 1.4 ml. of cumene hydroperoxide, 1.0 gram of a silicone foam stabilizer (a copolymer of a dimethylpolysiloxane and a polyoxyalkylene ether), and 5.0 grams of trichlorofluoromethane (Freon-11). To the mixture is added 3.5 ml. of a solution of 26% by weight triethylborane, 21% by weight pyridine, and 53% by weight n-hexane. The resultant mixture is poured onto a metal plate, against which plate a finely divided stream of water is directed at a delivery rate approximately one inch per hour. Foaming commences within five seconds and proceeds smoothly to completion in conjunction with the poylmerization, unhampered by the stream of water.

EXAMPLE 3

A quantity of 29.4 grams of maleic anhydride is mixed thoroughly with 29.7 grams of polyethylene glycol having an average molecular weight of 200. The mixture is heated to about 60°C, at which time 0.4 gram of propoxylated triol of an average molecular weight of 440 (LK-380) is added. Next, 31.2 grams of styrene, 1.25 grams of silicone foam stabilizer, 10.0 grams of tricholorofluoromethane (Freon-11), and 1.4 ml. of cumene hydroperoxide is added in the order specified. To the mixture is added 3.5 ml. of a triethylborane-pyridine complex compounded as described in Example 2. The resultant mixture is poured into water about three feet deep; the water temperature is about 20° C. Foaming begins within 5 seconds after the mixture settles. The foamed material rises to the surface of the water where the foaming and ploymerization is completed.

EXAMPLE 4

A quantity of 19.8 grams of maleic anhydride and 20.0 grams of polyethylene glycol with an average molecular weight of 200 is mixed thoroughly. With continued stirring, 2.0 grams of silicone foam stabilization agent, 3.2 grams of pentane, 41.6 grams of styrene, 0.6 ml. of cumene hydroperoxide and finally 2.5 ml. of a triethylboranepyridine complex compounded as described in Example 2, are added. The mixture is poured into water about three feet deep; the water temperature is about 20° C. Foaming begins within 10 seconds after the mixture settles. The foamed material rises to the surface of the water where the foaming and polymerization is completed. A white rigid foam, representing a 30 fold increase in volume, is produced having cells ranging in diameter from less than 1 mm. up to 3 mm.

EXAMPLE 5

The procedure described in Example 4 is followed except that the monomer system is poured into water 33 feet deep. A white rigid foam, representing a 20 fold increase in volume, is produced having cells ranging in diameter from less than 1 mm. up to 3 mm.

EXAMPLE 6

Commercial foam producing devices, such as a Martin-Sweets foam machine equipped with a nozzle adapted to mix three separate reactant streams, can be used to prepare cellular products according to the process of this invention. Reactant stream A consists of a solution obtained by warming 2127 grams of maleic anhydride and 2323 grams of tetraethylene glycol; the temperature of reactant stream A is maintained at 40° C. Stream B consists of a solution prepared by mixing 2420 grams of styrene, 1853 grams of saturated polyester, 1010 grams of Freon-11 and 17 grams of cumene hydroperoxide; the temperature of stream B is maintained at 25° C. The third reactant stream C consists of 825 grams of tetraethylene glycol, 233 grams of silicone foam stabilizer, 62 grams of triethylborane, and 50 grams of pyridine. The rate of flow of each of the reactant streams is adjusted so that stream A delivers about 50 to 55% of the total compounded mixture, stream B from 35% to 45%, and stream C from 1.5 to 3.5%. A strip of about 1,000 grams of the reactant mixture is delivered to a tank of water. Within 5 seconds foaming begins. After foaming and polymerization has occurred, the product is floating on the surface of the water in the form of a rigid, low density bar of foam about 6 inches in diameter and 5 feet in length. The foam has good compression strength, a high closed-cell content, and a desnity of about 2 pounds per cubic foot.

The process of the present invention is useful in a variety of circumstances where it may be desirable to produce a foam under conditions of high moisture. As an example, the instant process can be utilized to produce foams capable of raising sunken objects such as ships, capsized boats, ore, etc. Further uses includes the rapid placement of a floating bridge, insulation of buildings under any and all weather conditions, and, in conjunction with suitable wire reinforcement, the rapid alteration of water flow in streams.

Processing techniques can be varied from the techniques described in the above examples to obtain foams having significantly different properties. For instance, variation of the anhydride-polyol ratio or of the anhydride-ethylenically unsaturated monomer ratio is possible to delay or accelerate the period of gelation with respect to the maximum exotherm. Variation in the kind and amount of amine complexing agent is useful in regulating cell size and product density. Accordingly, these and other modifications are contemplated which can be made within the spirit of the described invention.

What is claimed is:

1. A process for preparing foamed polymeric compositions comprising conducting while submerged in water, a reaction of
   (a) an olefinically unsaturated polycarboxylic acid anhydride having ethylenic unsaturation activated by adjacent carbonyl groups,
   (b) a polyol, in a concentration sufficient to provide from about 0.25 to about 4 equivalents of hydroxyl groups per equivalent of carbonyl groups in the unsaturated polycarboxylic acid anhydride, and
   (c) an ethylenically unsaturated monomer, in a concentration sufficient to provide from about 0.25 to about 6 moles of said monomer per mole of unsaturated polycarboxylic acid anhydride said ethylenically unsaturated monomer being capable of copolymerization with the double bond of said acid anhydride in the presence of an expanding agent and in the presence of a free radical catalyst obtained by the decomposition of a peroxygen compound, wherein the exotherm of the reaction is employed in conjunction with said expanding agent to produce a cellular product.

2. A process according to claim 1 wherein acceleration of the decomposition of said peroxygen compound is obtained by the use of a complexed trihydrocarbylborane/amine accelerator.

3. A process according to claim 2 wherein said acelerator is an equimolar complex of triethylborane and pyridine.

4. A process according to claim 1 wherein said olefinically unsaturated polycarboxylic acid anhydride is maleic anhydride.

5. A process according to claim 1 wherein said polyol is tetraethylene gylcol.

6. A process according to claim 1 wherein said polyol is polyethylene glycol having an average molecular weight of 200.

7. A process according to claim 1 wherein said ethylenicaly unsaturated monomer is styrene.

8. A process according to claim 1 wherein said peroxygen compound is an organic hydroperoxide.

9. A process according to claim 1 wherein a viscosity increasing agent is added to the reaction mixture prior to the introduction of said mixture to conditions of high moisture.

10. A process for preparing foamed polymeric compositions comprising conducting while submerged in water reaction of
   (a) maleic anhydride, (b) a polyol selected from the group consisting of tetraethylene glycol and polyethylene glycol, having an average molecular weight of 200 in a concentration sufficient to provide from about 0.25 to about 4 equivalents of hydroxyl groups per equivalent of carbonyl groups in the maleic anhydride, and (c) styrene in a concentration sufficient to provide from 0.25 to about 6 moles of styrene per mole of maleic anhydride in the presence of an expanding agent and in the presence of a free radical catalyst system comprising an organic hydroperoxide whose decomposition to free radicals is accelerated by a trialkylborane complexed with an amine, wherein the exotherm of the reaction is employed in conjunction with said expanding agent to produce a cellular product.

References Cited

UNITED STATES PATENTS

| | | | |
|---|---|---|---|
| 2,324,739 | 7/1943 | Stoops | 260—78.5 |
| 2,418,688 | 4/1947 | Atwood | 260—78.5 |
| 3,232,893 | 2/1966 | Salgado et al. | 260—2.5 |
| 3,298,972 | 1/1967 | Kern | 260—78.5 |
| 2,047,398 | 7/1936 | Voss et al. | 260—2 |

FOREIGN PATENTS

| | | |
|---|---|---|
| 1,302,649 | 7/1962 | France. |
| 795,262 | 5/1958 | Great Britain. |

MURRAY TILLMAN, *Primary Examiner.*

J. T. GOOLKASIAN, *Assistant Examiner.*